(12) United States Patent
Wang et al.

(10) Patent No.: US 11,536,557 B2
(45) Date of Patent: Dec. 27, 2022

(54) VOLUME MEASURING APPARATUS WITH MULTIPLE BUTTONS

(71) Applicant: CHAMPTEK INCORPORATED, New Taipei (TW)

(72) Inventors: Kuo-Chun Wang, New Taipei (TW); Shu-Ying Huang, New Taipei (TW)

(73) Assignee: CHAMPTEK INCORPORATED, New Taipei (TW)

(*) Notice: Subject to any disclaimer, the term of this patent is extended or adjusted under 35 U.S.C. 154(b) by 0 days.

(21) Appl. No.: 17/234,582

(22) Filed: Apr. 19, 2021

(65) Prior Publication Data
US 2021/0372770 A1 Dec. 2, 2021

(30) Foreign Application Priority Data
May 29, 2020 (TW) ................................. 109118094

(51) Int. Cl.
| | | |
|---|---|---|
| *H04N 5/247* | (2006.01) | |
| *H04N 5/232* | (2006.01) | |
| *G01B 11/02* | (2006.01) | |
| *G06K 7/14* | (2006.01) | |
| *G06K 7/10* | (2006.01) | |

(52) U.S. Cl.
CPC ........ *G01B 11/022* (2013.01); *G06K 7/10722* (2013.01); *G06K 7/1413* (2013.01); *H04N 5/232* (2013.01); *H04N 5/247* (2013.01)

(58) Field of Classification Search
CPC .............................. G01C 3/00; H04N 5/2254
See application file for complete search history.

(56) References Cited

U.S. PATENT DOCUMENTS

| | | | |
|---|---|---|---|
| 9,396,554 B2 | 7/2016 | Williams et al. | |
| 9,798,912 B1* | 10/2017 | Brock | ................... G06K 7/1413 |
| 10,628,968 B1* | 4/2020 | Ta-Huynh | ................. G06T 7/80 |

(Continued)

FOREIGN PATENT DOCUMENTS

| | | | | |
|---|---|---|---|---|
| CN | 101409826 B | * | 9/2012 | ................ G01P 3/38 |
| CN | 101409826 B | * | 9/2012 | ............. H04N 7/181 |

(Continued)

OTHER PUBLICATIONS

Search Report dated Oct. 12, 2021 of the corresponding European patent application No. 21169728.9.

*Primary Examiner* — Zaihan Jiang
(74) *Attorney, Agent, or Firm* — Chun-Ming Shih; HDLS IPR Services

(57) ABSTRACT

A volume measuring apparatus is disclosed and includes a body having a working part and a holding part extended downward from the bottom of the working part, a processor arranged in the body, a first camera, a second camera, and a barcode capturing unit arranged on a front end of the working part, a first button arranged on one side of the holding part, and a second button arranged on a top of the working part. The first button and the second button are different types of button. By respectively operating the first button and the second button, the processor is controlled to perform a measuring action of the volume of a target box or to perform a decoding action of a target barcode based on the image captured by at least one of the first camera, the second camera, and the barcode capturing unit.

9 Claims, 7 Drawing Sheets

(56) References Cited

U.S. PATENT DOCUMENTS

| | | | | |
|---|---|---|---|---|
| 2001/0007346 A1* | 7/2001 | Yamakawa | .......... | H04N 1/0402 250/208.1 |
| 2002/0071038 A1* | 6/2002 | Mihelcic | ............ | G01B 11/2518 348/207.99 |
| 2010/0134598 A1* | 6/2010 | St-Pierre | ............ | G01B 11/2513 348/47 |
| 2011/0160083 A1* | 6/2011 | Hell | ....................... | G02B 21/16 506/9 |
| 2013/0280828 A1* | 10/2013 | Ainspan | ................... | G01J 11/00 257/E21.53 |
| 2013/0329013 A1 | 12/2013 | Metois et al. | | |
| 2014/0267286 A1* | 9/2014 | Duparre | ................. | G09G 3/002 345/428 |
| 2015/0285746 A1* | 10/2015 | Suematsu | ............... | H01J 37/20 348/86 |
| 2016/0150227 A1* | 5/2016 | Ainspan | ............... | H04N 17/002 348/188 |
| 2017/0300734 A1 | 10/2017 | Zheng et al. | | |
| 2019/0166348 A1* | 5/2019 | Kempf | ............... | G01B 11/2513 |
| 2019/0327404 A1* | 10/2019 | Yata | ................... | H04N 5/23232 |
| 2019/0371071 A1* | 12/2019 | Lyons | .................... | G06F 3/0304 |
| 2020/0020024 A1* | 1/2020 | Lyons | .................... | G06F 3/011 |

FOREIGN PATENT DOCUMENTS

| | | | |
|---|---|---|---|
| JP | 2012198936 A | | 10/2012 |
| TW | M592119 U | | 3/2020 |
| WO | WO2014025559 | * | 7/2013 |

* cited by examiner

VOLUME MEASURING APPARATUS WITH MULTIPLE BUTTONS

BACKGROUND OF THE DISCLOSURE

Technical Field

The present disclosure relates to a volume measuring apparatus, and specifically relates to a volume measuring apparatus having multiple buttons.

Description of Related Art

Generally, for calculating processing fee and delivering fee of goods, the staffs of the shipping company have to measure the volume and/or weight of the goods. In order to assist the staffs of the shipping company to easily obtain such data, there are multiple types of measuring apparatuses in the market that may help the staffs to measure the volume of the goods.

On the other hand, in order to let the staffs to trace and record the processing progress of the goods, the shipping company usually generates a barcode and sticks the barcode to the outer package of the goods according to information related to the goods, such as sender, recipient, content of the goods, goods number, etc. Therefore, the staffs may scan the barcode of the goods through a barcode scanner to directly obtain the related information of the goods, so as to trace and record the goods.

However, the related-art measuring apparatus and the barcode scanner are separated, the staffs need to first use the measuring apparatus to measure the volume of the goods, and then use the barcode scanner to scan the barcode of the goods to obtain the related information, which is inconvenient in operation.

Besides, in order to perform the above two actions simultaneously, the shipping company has to buy the measuring apparatus and the barcode scanner respectively, hence the hardware cost of the shipping company may be increased.

SUMMARY OF THE DISCLOSURE

The disclosure is directed to a volume measuring apparatus having different types of button, which may control single device through multiple buttons with different types to respectively implement a measuring action for a volume of a box and a decoding action for a barcode.

In one of the exemplary embodiments, the volume measuring apparatus of the disclosure at least includes a body having a working part and a holding part extended downward from a bottom of the working part; a processor arranged in the body; a first camera, a second camera and a barcode capturing unit arranged on a front end of the working part; a first button arranged on one side of the holding part; and a second button arranged on a top of the working part. The first button and the second button are different types of button. By respectively operating the first button and the second button, the processor may be controlled to execute a measuring action for a volume of a box and a decoding action for a barcode based on image captured by the first camera, the second camera, or the barcode capturing unit.

In comparison with related art, the volume measuring apparatus of the present disclosure may perform a measuring action for a volume of a box and a decoding action for a barcode respectively through at least two different types of button, so the practicability and using flexibility of the volume measuring apparatus may be expanded, and the hardware cost of the manufacturers may be reduced.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure provides a volume measuring apparatus having different types of button, when each of the buttons is triggered, the volume measuring apparatus may optionally perform a volume measuring program or a decoding program, so as to measure volume-related data of an outer box, such as width, height, length, etc., or to scan and decode a barcode to obtain content of the barcode. Therefore, a user is benefitted in simultaneously obtaining volume-related data of the box and information related to content inside the box.

Figure 1A:
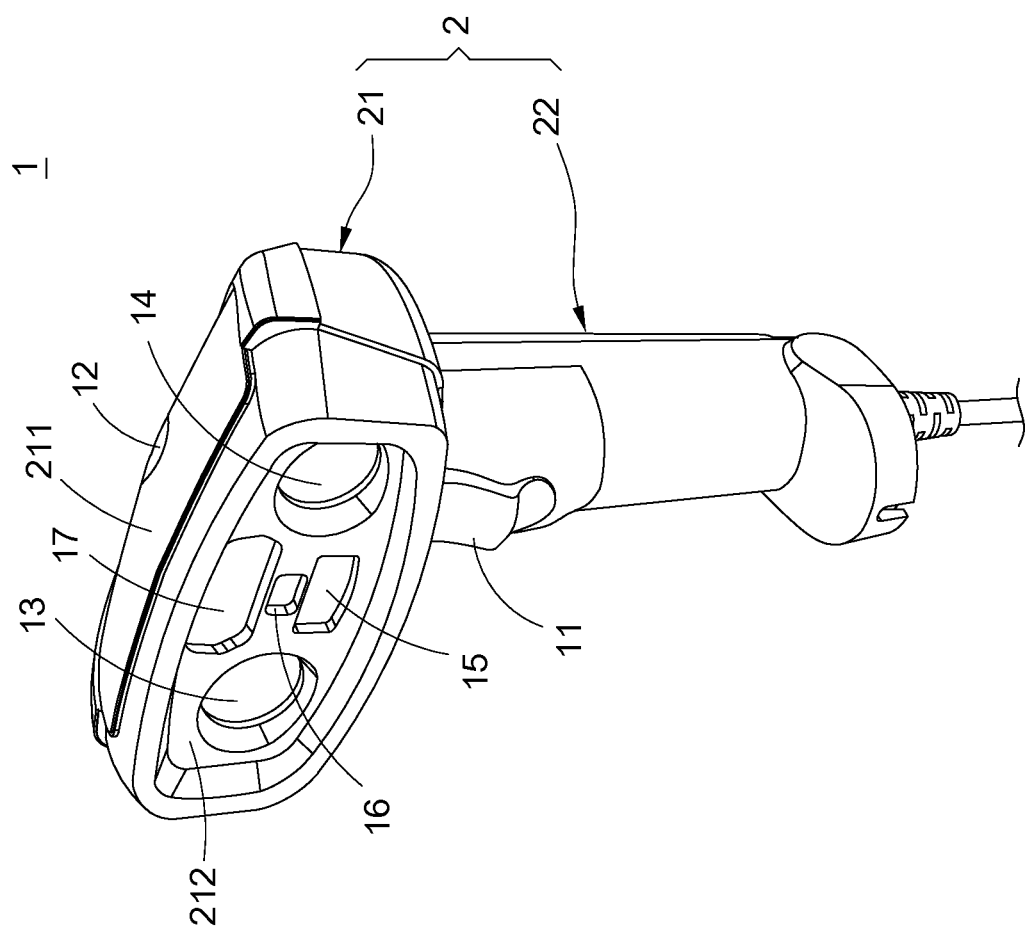
FIG. 1A is a schematic diagram of a volume measuring apparatus of a first embodiment according to the present disclosure.
Figure 1B:
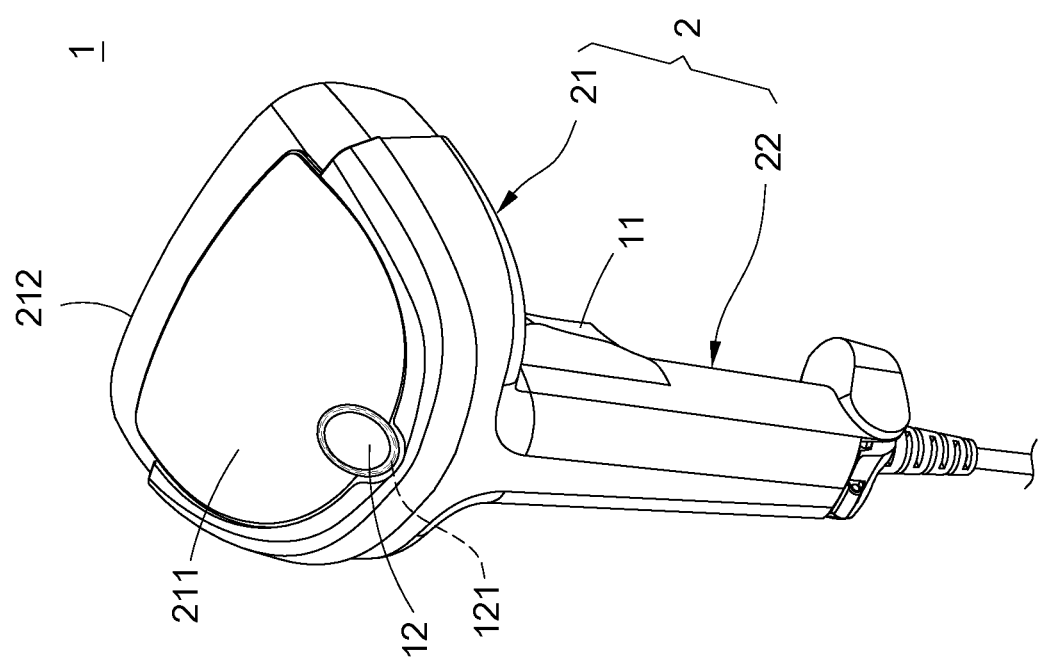
FIG. 1B is a schematic diagram of the volume measuring apparatus of a second embodiment according to the present disclosure.
Figure 2:
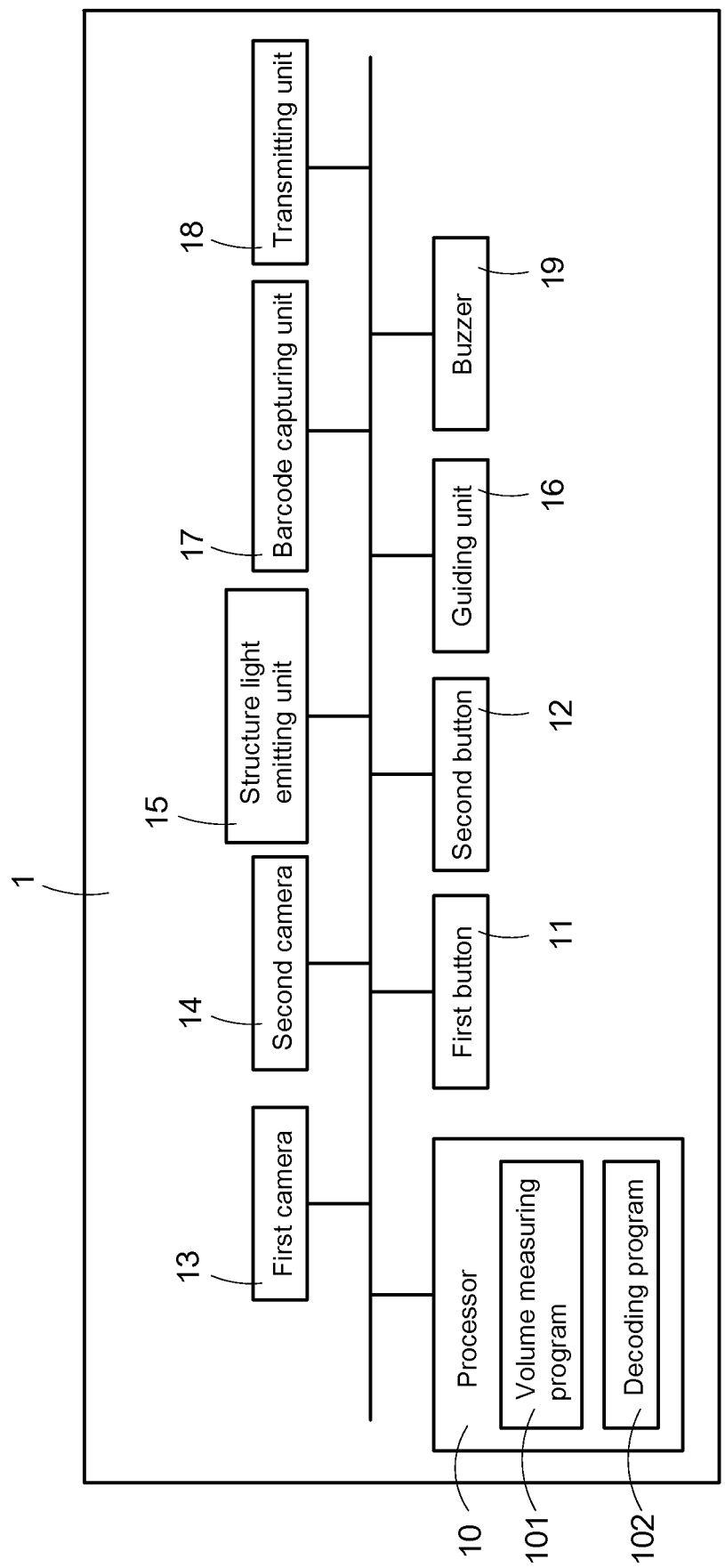
FIG. 2 is a block diagram of a volume measuring apparatus of a first embodiment according to the present disclosure.

Please refer to FIG. 1A, FIG. 1B, and FIG. 2, FIG. 1A is a schematic diagram of a volume measuring apparatus of a first embodiment according to the present disclosure, FIG. 1B is a schematic diagram of the volume measuring apparatus of a second embodiment according to the present disclosure, and FIG. 2 is a block diagram of a volume measuring apparatus of a first embodiment according to the present disclosure.

The present disclosure shows a volume measuring apparatus 1 (referred to as the measuring apparatus 1 hereinafter) used to measure a volume of a rectangular box. As disclosed in the figures, the measuring apparatus 1 at least includes a body 2. The body 2 at least has a working part 21 and a holding part 22 extended downward from a bottom of the working part 21. The working part 21 is arranged with multiple components that are used for a measuring action, and the holding part 22 is arranged for a user to hold by at least one hand.

As disclosed in FIG. 2, in the body 2, the measuring apparatus 1 in the disclosure at least includes a processor 10, a first button 11, a second button 12, a first camera 13, a second camera 14, and a barcode capturing unit 17. The first button 11, the second button 12, the first camera 13, the second camera 14, and the barcode capturing unit 17 are electrically connected with the processor 10. The first button 11 and the second button 12 are different types of button.

In one of the exemplary embodiments as shown in FIG. 1A and FIG. 1B, the first button 11 is arranged on one side of the holding part 22 and is exposed from the body 2 for the user to press. The second button 12 is arranged on a top 211 of the working part 21 and is exposed from the body 2 for the user to press.

The measuring apparatus 1 disclosed in the present disclosure is a hand-held measuring apparatus. When the user holds the measuring apparatus 1 by one hand, the user may use the palm to hold the holding part 22, put the index finger on the first button 11, and touch the second button 12 by the thumb. For ergonomics concern, the first button 11 may be a mechanical button, the second button 12 may be a touch button such as a capacitive touch button or a resistive touch button, but not limited thereto. In another embodiment, the first button 11 may be a touch button and the second button 12 may be a mechanical button, the embodiment shown in FIG. 1A and FIG. 1B are not intended to limit the scope of the present disclosure.

It is worth saying that, as shown in FIG. 1B, the second button 12 of the disclosure is arranged on the top 211 of the working part 21, and the measuring apparatus 1 may apply a waterproof structure 121 in the body 2 for the second button 12. The waterproof structure 12 is arranged on the inside of the top 211 of the working part 21 and encompasses the second button 12. The arrangement of the waterproof structure 121 may prevent water or other liquid from flowing into the body 2 through the surrounding of the second button 12 of the top 211 of the working part 21 and causing damage to the components in the measuring apparatus 1. Therefore, the measuring apparatus 1 of the disclosure may be used under various environments.

As shown in FIG. 1A, the first camera 13 and the second camera 14 are arranged on a front end 212 of the working part 21, and are exposed on the body 2 from the front end 212, so as to capture images. In this disclosure, the processor 10 is used to execute a corresponding application program based on the images captured by the first camera 13 and the second camera 14, so as to compute a volume of a box.

As shown in FIG. 1A, the barcode capturing unit 17 is arranged collectively with the first camera 13 and the second camera 14 on the front end 212 of the working part 21, and is exposed from the body 2 to capture images. In one of the exemplary embodiments, the images captured by the barcode capturing unit 17 may be, for example, image signals or light signals. In this disclosure, the barcode capturing unit 17 may be a photographic lens, or a combination of a light emitter and a sensor. The processor 10 may execute a corresponding application program in accordance with the images captured by the barcode capturing unit 17, so as to decode a barcode and to obtain content of the barcode.

In particular, the processor 10 of this disclosure at least records a volume measuring program 101 and a decoding program 102. The volume measuring program 101 is used to compute the images captured by the first camera 13 and the second camera 14 to obtain volume-related data (such as width, height, depth, etc.) of a target box (such as the target box 3 shown in FIG. 3B) in the captured images.

Figure 3A:
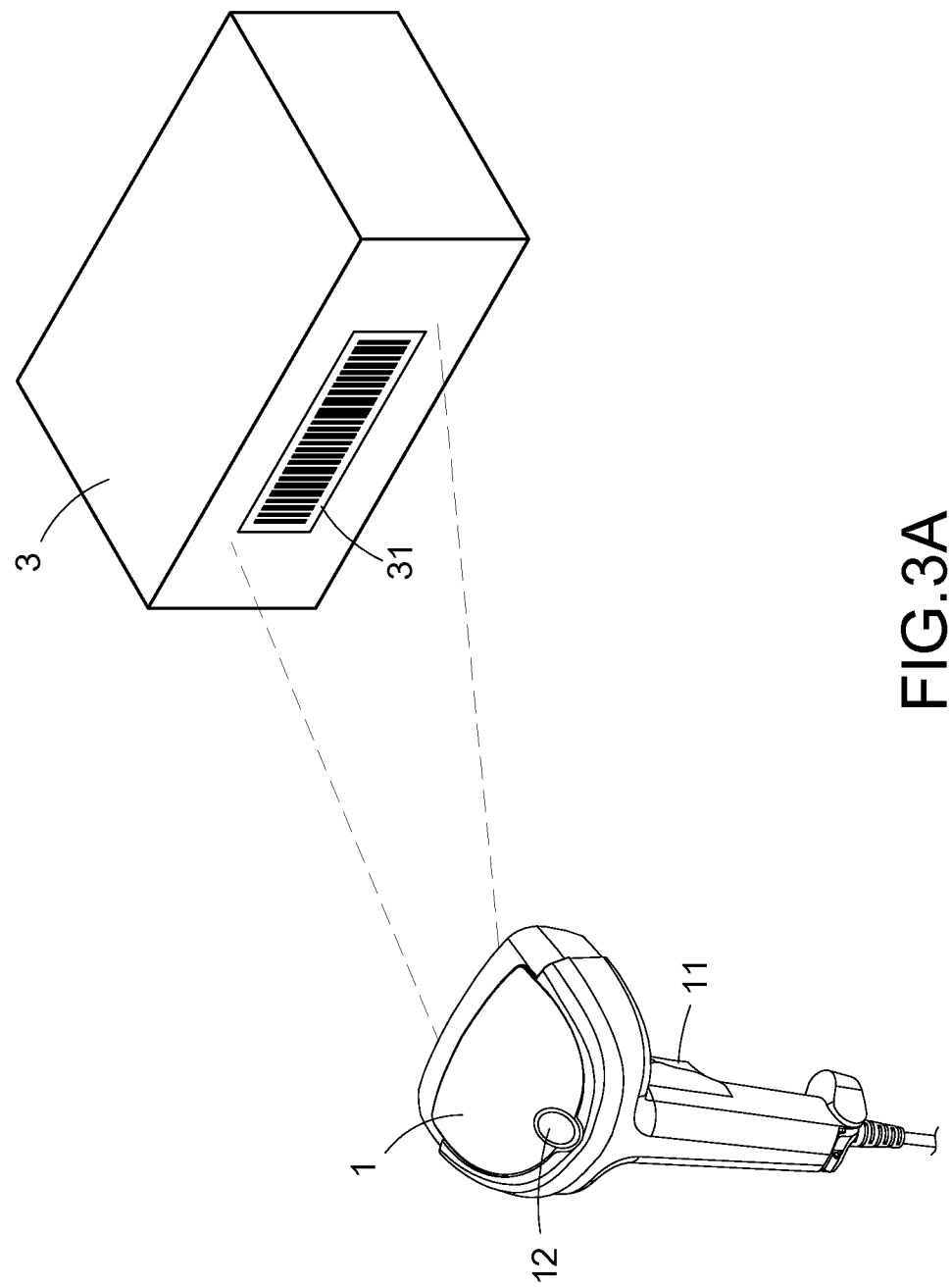
FIG. 3A is a schematic diagram showing a first using status of the volume measuring apparatus according to the present disclosure.

The decoding program 102 is used to perform an image identification to the images captured by the barcode capturing unit 17 to decode a target barcode (such as the target barcode 31 as shown in FIG. 3A) in the captured images, so as to obtain content of the target barcode 31.

One technical feature of the disclosure is that, when one of the first button 11 and the second button 12 is triggered, the processor 10 may control at least one of the first camera 13, the second camera 14, and the barcode capturing unit 17 to capture an image, and execute an application program (i.e., the volume measuring program 101 or the decoding program 102) that corresponds to the triggered button (i.e., the first button 11 or the second button 12), so as to obtain the volume of the target box 3, or content of the target barcode 31.

In a first embodiment, the measuring apparatus 1 is set to correlate the first button 11 with the volume measuring program 101, and correlate the second button 12 with the decoding program 102. In this embodiment, when the first button 11 is pressed by the user, the processor 10 is triggered to execute the volume measuring program 101 to perform a measuring action for the volume of the target box 3. When the second button 12 is pressed by the user, the processor 10 is triggered to execute the decoding program 102 to perform a decoding action for content of the target barcode 31.

In a second embodiment, the measuring apparatus 1 is set to correlate the first button 11 with the decoding program 102, and correlate the second button 12 with the volume measuring program 101. In this embodiment, when the first button 11 is pressed by the user, the processor 10 is triggered to execute the decoding program 102 to perform the decoding action for content of the target barcode 31. When the second button 12 is pressed by the user, the processor 10 is triggered to execute the volume measuring program 101 to perform the measuring action for the volume of the target box 3.

In the first and second embodiments, the first button 11 and the second button 12 are used as two independent triggering buttons and respectively correlated with different execution targets (i.e., the volume measuring program 101 and the decoding program 102). Accordingly, the user may trigger the processor 10 to respectively execute the measuring action for the volume of the target box 3 and the decoding action for content of the target barcode 31 through the two different triggering buttons.

In a third embodiment, a predetermined setting of the measuring apparatus 1 is to correlate the first button 11 with one of the volume measuring program 101 and the decoding program 102, and set the second button 12 as a switch for switching the execution targets of the first button 11.

For example, if the predetermined setting of the measuring apparatus 1 is to correlate the first button 11 with the volume measuring program 101, the processor 10 is triggered to execute the volume measuring program 101 to perform the measuring action for the volume of the target box 3 when the first button 11 is pressed by the user. When the second button 12 is pressed by the user, the processor 10 is triggered to switch the execution target of the first button 11, so the first button 11 is changed to correlate with the decoding program 12. Therefore, when the first button 11 is pressed again by the user, the processor 10 is triggered to execute the decoding program 102 to perform the decoding action for content of the target barcode 31. When the second button 12 is pressed again by the user, the processor 10 is triggered again to switch the execution target of the first button 11, so the first button 11 is changed from correlating with the decoding program 102 to correlate with the volume measuring program 101.

In a fourth embodiment, the predetermined setting of the measuring apparatus 1 is to correlate the second button 12 with one of the volume measuring program 101 and the decoding program 102, and set the first button 11 as a switch for switching the execution targets of the first button 11. In this embodiment, the user may control the processor 10 to execute the volume measuring program 101 or the decoding program 102 through pressing the second button 12, and control the processor 10 to switch the execution target of the second button 12 through pressing the first button 11.

As shown in FIG. 2, the measuring apparatus 1 of the present disclosure may include a buzzer 19 arranged in the body 2 and electrically connected with the processor 10. The purpose of the processor 10 executing the volume measuring program 101 is to measure the volume of the target box 3 in a three-dimensional space. In order to remind the user that the performing function at the very time is a volume measuring function under a three-dimensional space, the buzzer 19 may be controlled by the processor 10 to sound three times when the processor 10 is triggered by the first button 11 or the second button 12 to switch the execution target of another button from the decoding program 102 to the volume measuring program 101.

Moreover, the purpose of the processor 10 to execute the decoding program 102 is to obtain content of the target barcode 31 in a two-dimensional space. In order to remind the user that the performing function at the very time is a barcode decoding function under a two-dimensional space, the buzzer 19 may be controlled by the processor 10 to sounds two times when the processor 10 is triggered by the first button 11 or the second button 12 to switch the execution target of another button from the volume measuring program 101 to the decoding program 102.

The above description is only one of the exemplary embodiments of the present disclosure, but not limited thereto.

Please refer to FIG. 3A, which is a schematic diagram showing a first using status of the volume measuring apparatus according to the present disclosure. The embodiment of FIG. 3A is illustrated by correlating the first button 11 with the decoding program 102.

In the embodiment of FIG. 3A, when the user presses the first button 11 correlated with the decoding program 102, the processor 10 is triggered by the first button 11 to execute the decoding action for the barcode. In particular, when the first button 11 is pressed, the processor 10 executes the decoding program 102, and controls the barcode capturing unit 17 to capture an image, the captured image at least includes an image (image signal or light signal) of the target barcode 31 to be analyzed. In the embodiment of FIG. 3A, the target barcode 31 is sticked on the target box 3, but not limited thereto.

After the barcode capturing unit 17 is controlled to obtain the image, the processor 10 performs an image identification procedure to the image through the decoding program 102, so as to obtain content of the target barcode 31 in the image and complete the decoding action for the target barcode 31.

In another embodiment, the measuring apparatus 1 may correlate the second button 12 with the decoding program 102, so the user may trigger the processor 10 to execute the decoding action for the target barcode 31 through pressing the second button 12, but not limited thereto.

Figure 3B:
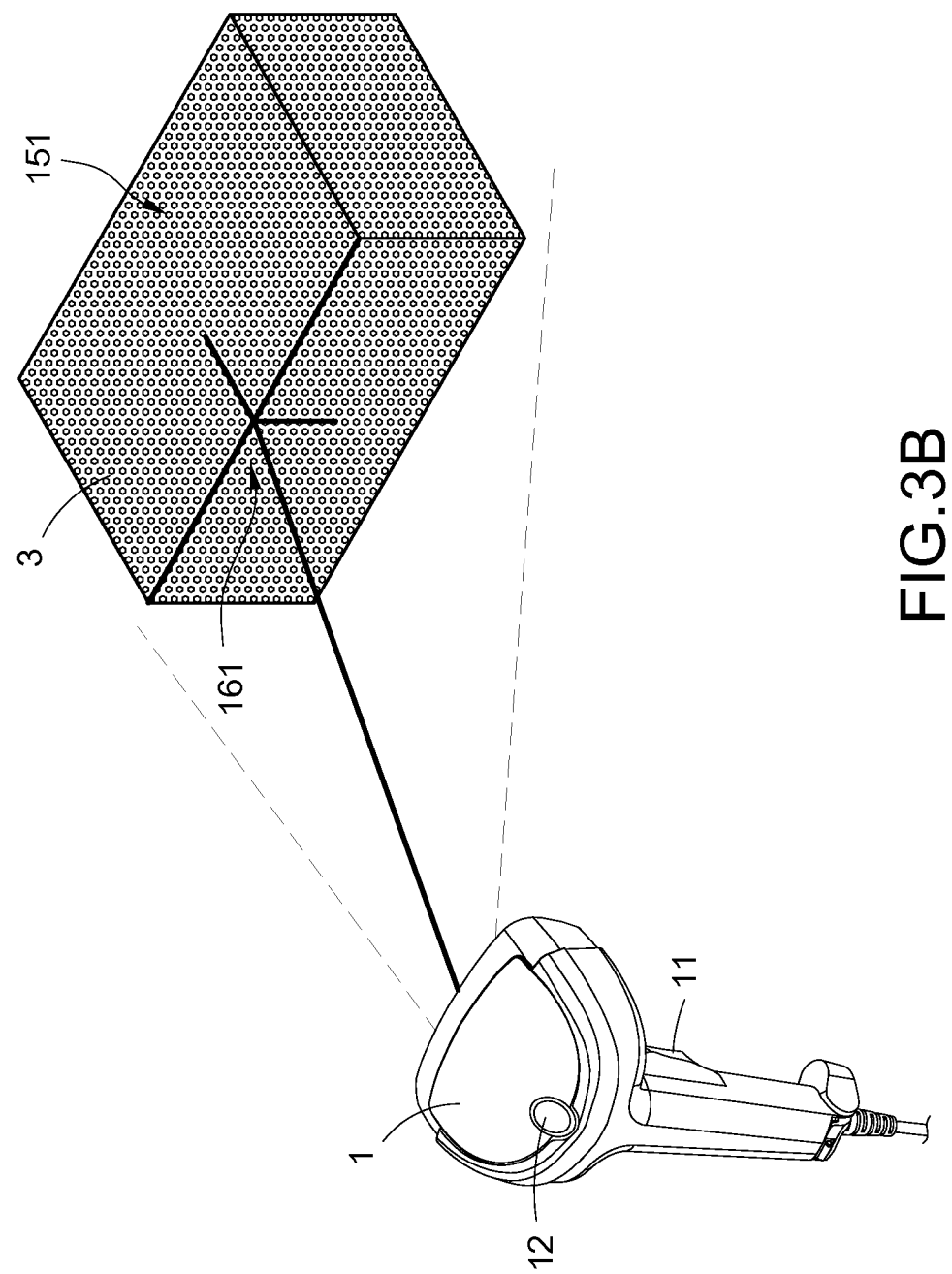
FIG. 3B is a schematic diagram showing a second using status of the volume measuring apparatus according to the present disclosure.

Please refer to FIG. 3B, which is a schematic diagram showing a second using status of the volume measuring apparatus according to the present disclosure. The embodiment of FIG. 3B is illustrated by correlating the second button 12 with the volume measuring program 101.

In the embodiment of FIG. 3B, when the user presses the second button 12 correlated with the volume measuring program 101, the processor 10 may be triggered by the second button 12 to execute the measuring action for the volume of the target box 3.

In order to implement the measuring action more precisely, the measuring apparatus 1 of the disclosure may include a structure light emitting unit 15 electrically connected with the processor 10 as disclosed in FIG. 2. As disclosed in FIG. 1A, the structure light emitting unit 15 is arranged collectively with the first camera 13, the second camera 14, and the barcode capturing unit 17 on the front end 212 of the working part 21 of the body 2, and the structure light emitting unit 15 is exposed on the body 2 from the front end 212.

When the second button 12 is pressed, the processor 10 may execute the volume measuring program 101, and control the structure light emitting unit 15 to emit an invisible structure light to form a reference pattern 151. Also, the processor 10 controls the first camera 13 to capture a left image, and controls the second camera 14 to capture a right image. The left image at least includes an entire image of the target box 3 and an image of the reference pattern 151, the right image at least includes an entire image of the target box 3 and an image of the reference pattern 151. After obtaining the left image and the right image, the processor 10 computes the left image and the right image through the volume measuring program 101 to obtain volume-related data (such as width, height, depth, etc.) of the target box 3 and completes the measuring action for the volume of the target box 3.

In another embodiment, the measuring apparatus 1 may correlate the first button 11 with the volume measuring program 101, so the user may trigger the processor 10 to execute the measuring action for the volume of the target box 3 through pressing the first button 11, not limited thereto.

In the above embodiment, the processor 10 controls the structure light emitting unit 15 to project the reference pattern 151 onto the target box 3, and controls the first camera 13 and the second camera 14 to respectively capture the left image and the right image that each includes the image of the reference pattern 151. Therefore, the volume measuring program 101 may perform a computation based on the images of the target box 3 and the reference pattern 151 in the left image and the right image to generate a depth graphic of the target box 3.

In particular, the reference pattern 151 is formed by multiple elements such as identifiable points, shapes, graphics, texts, symbols, etc., FIG. 3B is illustrated by multiple identifiable points, but not limited thereto. When the depth graphic is generated, the processor 10 searches for identical elements in the left image and the right image, finds the location difference of each element in the left image and in the right image, computes corresponding depth information of each element according to the location difference, and generates the depth graphic according to the depth information. After the depth graphic is generated, the volume measuring program 101 scans the depth graphic through multiple virtual scanning lines to determine a contour of the target box 3 in the depth graphic, and computes width information, height information, and depth information of the target box 3 based on the determined contour.

In order to improve the accuracy of the measured volume, the measuring apparatus 1 of the disclosure may optionally include a guiding unit 16 electrically connected with the processor 10 as shown in FIG. 2. As disclosed in FIG. 1A, the guiding unit 16 is arranged collectively with the first camera 13, the second camera 14, the barcode capturing unit 17, and the structure light emitting unit 15 on the front end 212 of the working part 21 of the body 2, and the guiding unit 16 is exposed on the body 2 from the front end 212.

In the embodiment as shown in FIG. 3B, when the processor 10 is triggered by the second button 12 to execute the volume measuring program 101, the processor 10 controls the guiding unit 16 to emit a laser beam to form a guiding object 161 in a cross manner in front of the front end 212 of the working part 21. In the embodiment, the user may hold the measuring apparatus 1 to aim at the target box 3 through the guidance of the guiding object 161, and the first camera 13 and the second camera 14 may obtain the left image and the right image for the processor 10 to process effectively. Therefore, the accuracy of the volume-related data computed by the volume measuring program 101 may be improved.

Figure 4:
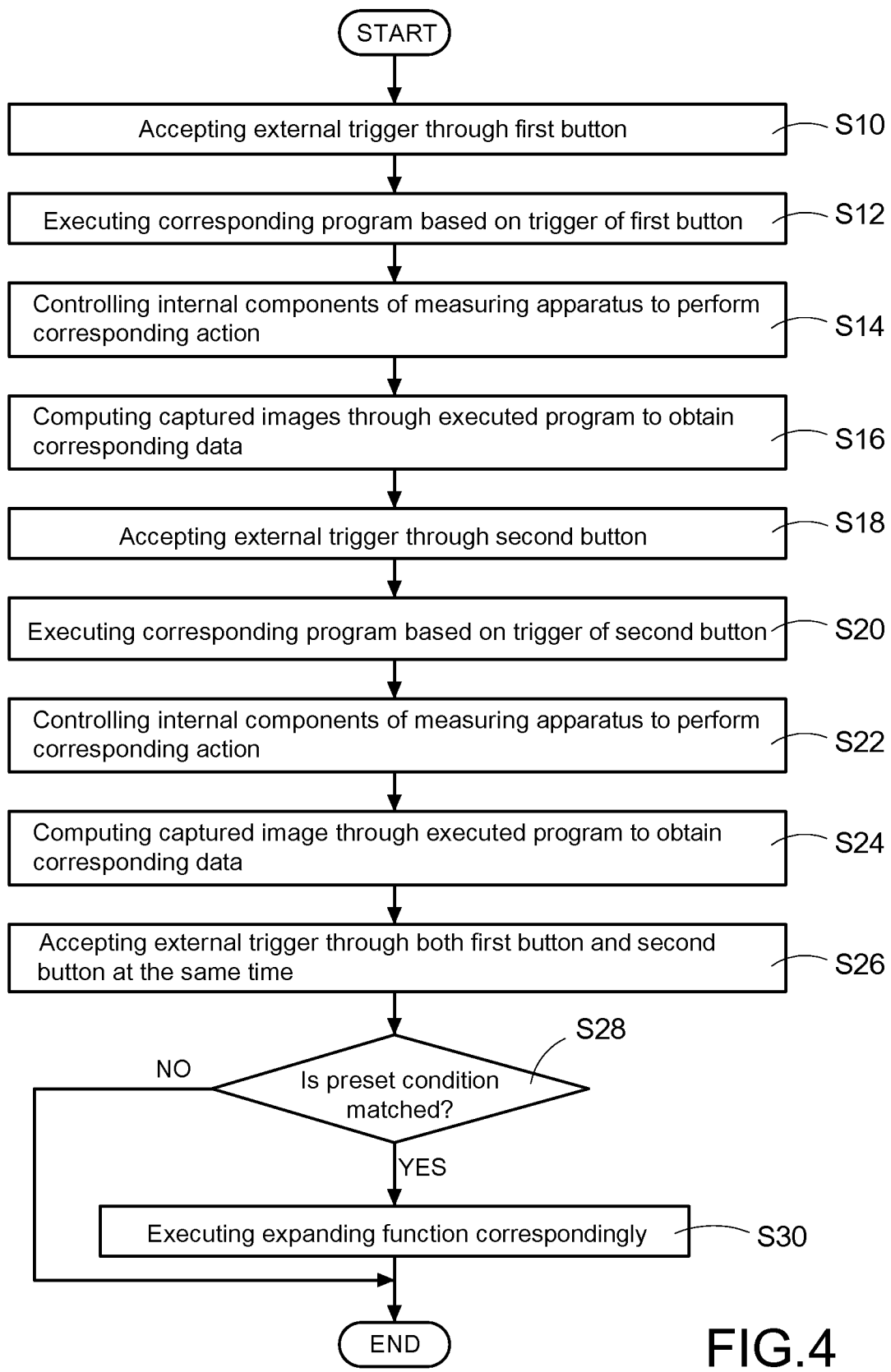
FIG. 4 is a flowchart of a button controlling method of a first embodiment according to the present disclosure.

Please refer to FIG. 4, which is a flowchart of a button controlling method of a first embodiment according to the present disclosure. The embodiment of FIG. 4 shows an example that respectively correlates each of the first button 11 and the second button 12 with a specific execution target (i.e., the volume measuring program 101 and the decoding program 102).

As shown in FIG. 4, the measuring apparatus 1 may accept an external trigger through the first button 11 (step S10), the processor 10 may execute a corresponding program based on the trigger of the first button 11 (step S12), and control the internal components of the measuring apparatus 1 to perform a corresponding action (step S14).

In one embodiment, the predetermined execution target of the first button 11 is the volume measuring program 101. In the step S12, the processor 10 reads and executes the volume measuring program 101 according to the trigger of the first button 11. In the step S14, the processor 10 controls the guiding unit 16 to emit the guiding object 151, controls the structure light emitting unit 15 to form the reference pattern 15, controls the first camera 13 to capture the left image including the images of the target box 3 and the reference pattern 15, and controls the second camera 14 to capture the right image including the images of the target box 3 and the reference pattern 15.

After the step S12 and step S14, the processor 10 may compute the captured images through the executed program to obtain corresponding data (step S16). In particular, if the execution target of the first button 11 is the volume measuring program 101, in the step S16, the processor 10 computes the left image and the right image through the executed volume measuring program 101 to obtain the volume-related data, such as width, height, depth, etc., of the target box 3.

On the other hand, the measuring apparatus 1 may accept an external trigger through the second button 12 (step S18), the processor 10 may execute a corresponding program based on the trigger of the second button 12 (step S20), and control internal components of the measuring apparatus 1 to perform a corresponding action (step S22).

In one embodiment, the predetermined execution target of the second button 12 is the decoding program 102. In the step S20, the processor 10 reads and executes the decoding program 102 according to the trigger of the second button 12. In the step S22, the processor 10 controls the barcode capturing unit 17 to capture an image (such as image signal or light signal) that includes the image of the target barcode 31.

After the step S20 and step S22, the processor 10 computes the captured image through the executed program to obtain corresponding data (step S24). In particular, if the execution target of the second button 12 is the decoding program 102, in the step S24, the processor 10 performs an image identification to the image through the executed decoding program 102 to obtain content of the target barcode 31.

In one embodiment, the measuring apparatus 1 may accept an external trigger through both the first button 11 and the second button 12 at the same time (step S26), i.e., the user may press the first button 11 and the second button 12 at the same time. In this embodiment, the processor 10 determines whether the manner, the time duration, or the pressed times of the first button 11 and the second button 12 being pressed matches a preset condition or not (step S28), so as to decide whether an expanding function is to be executed correspondingly (step S30).

In one embodiment, the processor 10 determines that the preset condition is matched when the first button 11 and the second button 12 are pressed at the same time, and the pressing is kept and exceeds a preset time period. In another embodiment, the processor 10 determines that the preset condition is matched when the first button 11 is pressed, the second button 12 is then pressed continually for several times while the first button 11 is pressed, and the pressed amount of the second button 12 reaches a preset amount. In another embodiment, the processor determines that the preset condition is matched when the second button 12 is pressed, the first button 11 is then pressed continually several times while the second button 12 is pressed, and the pressed amount of the first button 11 reaches a preset amount. The above descriptions are only few embodiments of the present disclosure, but not limited thereto.

As shown in FIG. 2, in one embodiment, the measuring apparatus 1 may include a transmitting unit 18 electrically connected with the processor 10. In the step S30, the processor 10 may transmit at least one of the left image captured by the first camera 13 and the right image captured by the second camera 14 through the transmitting unit 18 for the user to check when the manner, the time duration, or the pressed times of pressing the first button 11 and the second button 12 is determined to be matched with the preset condition. In the embodiment, at least one of the left image and the right image is a color image, and the color image includes the image of the target box 3 and/or the target barcode 31.

Figure 5:
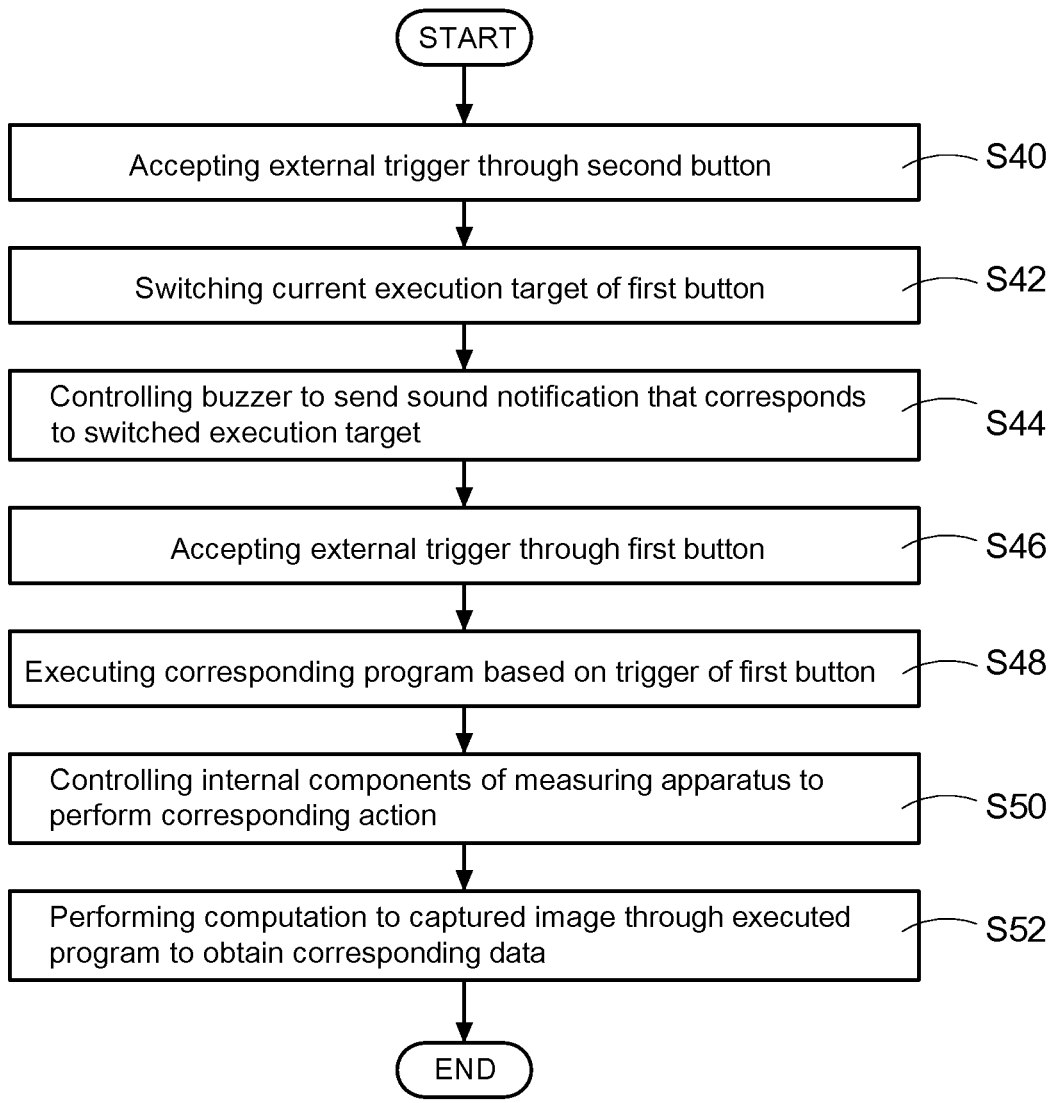
FIG. 5 is a flowchart of a button controlling method of the second embodiment according to the present disclosure.

FIG. 5 is a flowchart of a button controlling method of the second embodiment according to the present disclosure. The embodiment of FIG. 5 shows an example that correlates the first button 11 with a specific execution target (i.e., one of the volume measuring program 101 and the decoding program 102), and uses the second button 12 as a switch to change the execution target of the first button 11.

As shown in FIG. 5, the measuring apparatus 1 may accept an external trigger through the second button 12 (step S40), the processor 10 may switch the execution target at the very time of the first button 11 based on the trigger of the second button 12 (step S42), and control the buzzer 19 to send a sound notification that corresponds to the switched execution target (step S44).

In particular, if the current execution target of the first button 11 is the volume measuring program 101, when the second button 12 is triggered in the step S40, the processor 10 may switch the execution target of the first button 11 from the volume measuring program 101 to the decoding program 102 based on the trigger of the second button 12 in the step S42, and control the buzzer 19 to send a sound notification that represents the decoding program 102 (such as two sounds) in the step S44. If the execution target at the very time of the first button 11 is the decoding program 102, when the second button 12 is triggered in the step S40, the processor 10 may switch the execution target of the first button 11 from the decoding program 102 to the volume measuring program 101 based on the trigger of the second button 12 in the step S42, and control the buzzer 19 to send a sound notification that represents the volume measuring program 101 (such as three sounds) in the step S44.

Similarly, the measuring apparatus 1 may accept an external trigger through the first button 11 at any time (step S46), the processor 10 may execute a corresponding program based on the trigger of the first button 11 (step S48), and control the internal components of the measuring apparatus 1 to perform a corresponding action (step S50).

If the execution target of the first button 11 is set as the volume measuring program 101 due to the trigger of the second button 12, then the processor 10 may read and execute the volume measuring program 101 in the step S48, and the processor 10 may control the guiding unit 16 to emit the guiding object 151, control the structure light emitting unit 15 to form the reference pattern 151, and control the first camera 13 and the second camera 14 to respectively capture the left image and the right image in the step S50.

If the execution target of the first button 11 is set as the decoding program 102 due to the trigger of the second button 12, then the processor 10 may read and execute the decoding program 102 in the step S48, and the processor 10 may control the barcode capturing unit 17 to capture the image in the step S50.

After the step S50, the processor 10 may perform a computation to the captured image through the executed program to obtain corresponding data (step S52). In particular, if the execution target of the first button 11 is the volume measuring program 101, the processor 10 may compute the left image and the right image through the executed volume measuring program 101 to obtain the volume-related data of the target box 3 in the step S52. If the execution target of the first button 11 is the decoding program 102, the processor 10 may perform an image identification to the image through the executed decoding program 102 to obtain content of the target barcode 31.

According to the technical solutions discussed above, no matter the predetermined execution target of the first button 11 is the volume measuring program 101 or the decoding program 102, the user may trigger the second button 12 at any time to switch the execution target of the first button 11, which is convenient and fast for the user to implement the measuring action of the volume of the target box 3 and the decoding action of the target barcode 31 by using single measuring apparatus 1.

It is worth saying that, based on user's demand, the measuring apparatus 1 in the disclosure may optionally set the first button 11 and the second button 12 as the following modes:

(1) Setting the execution target of the first button 11 as the volume measuring program 101, and setting the execution target of the second button 12 as the decoding program 102;

(2) Setting the execution target of the first button 11 as the decoding program 102, and setting the execution target of the second button 12 as the volume measuring program 101;

(3) setting the predetermined execution target of the first button 11 as the volume measuring program 101, and setting the second button 12 as a switch to change the execution target of the first button 11;

(4) setting the predetermined execution target of the first button 11 as the decoding program 102, and setting the second button 12 as a switch to change the execution target of the first button 11;

(5) setting the predetermined execution target of the second button 12 as the volume measuring program 101, and setting the first button 11 as a switch to change the execution target of the second button 12; and (6) setting the predetermined execution target of the second button 12 as the decoding program 102, and setting the first button 11 as a switch to change the execution target of the second button 12.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A volume measuring apparatus with multiple buttons, the volume measuring apparatus comprising:
    a body, comprising a working part and a holding part extended downward from a bottom of the working part;
    a processor, arranged in the body and at least recording a volume measuring program and a decoding program;
    a first camera, arranged on a front end of the working part and electrically connected with the processor;
    a second camera, arranged on the front end of the working part and electrically connected with the processor;
    a barcode capturing unit, arranged on the front end of the working part and electrically connected with the processor;
    a first button, arranged on one side of the holding part and electrically connected with the processor, and comprising a mechanical button;
    a second button, arranged on a top of the working part and electrically connected with the processor, and comprising a touch button;
    a structure light emitting unit, electrically connected with the processor and arranged on the front end of the working part; and
    a guiding unit, electrically connected with the processor and arranged on the front end of the working part;
    wherein a type of the first button and a type of the second button are different, when one of the first button and the second button is triggered, the processor executes the volume measuring program in accordance with multiple images respectively captured by the first camera and the second camera to obtain a volume of a target box, or executes the decoding program in accordance with an image captured by the barcode capturing unit to obtain content of a target barcode;
    wherein, when the decoding program is executed, the processor is configured to control the barcode capturing unit to capture the image, and perform an image identification to the image through the decoding program to obtain content of the target barcode in the image;
    wherein, when the volume measuring program is executed, the processor is configured to control the guiding unit to emit a laser beam to configure a guiding object in a cross manner, control the structure light emitting unit to emit an invisible structure light to configure a reference pattern, control the first camera to capture a left image comprising an image of the target box and the reference pattern, control the second camera to capture a right image comprising the image of the target box and the reference pattern, and compute the left image and the right image through the volume measuring program to obtain the volume of the target box.

2. The volume measuring apparatus in claim 1, further comprising: a waterproof structure, arranged around the second button.

3. The volume measuring apparatus in claim 1, wherein the processor is triggered by the first button to execute the volume measuring program, and the processor is triggered by the second button to execute the decoding program.

4. The volume measuring apparatus in claim 1, wherein the processor is triggered by the first button to execute the decoding program, and the processor is triggered by the second button to execute the volume measuring program.

5. The volume measuring apparatus in claim 1, wherein an execution target of the first button is the volume measuring program or the decoding program, and the processor is triggered by the second button to switch the execution target of the first button.

6. The volume measuring apparatus in claim 5, further comprising: a buzzer, electrically connected with the processor, wherein the processor controls the buzzer to send a sound notification for two times when the processor is triggered to switch the execution target from the volume measuring program to the decoding program, and controls the buzzer to send the sound notification for three times when the processor is triggered to switch the execution target from the decoding program to the volume measuring program.

7. The volume measuring apparatus in claim 1, wherein an execution target of the second button is the volume measuring program or the decoding program, and the processor is triggered by the first button to switch the execution target of the second button.

8. The volume measuring apparatus in claim 7, further comprising: a buzzer, electrically connected with the processor, wherein the processor controls the buzzer to send a sound notification for two times when the processor is triggered to switch the execution target from the volume measuring program to the decoding program, and controls the buzzer to send the sound notification for three times when the processor is triggered to switch the execution target from the decoding program to the volume measuring program.

9. The volume measuring apparatus in claim 1, further comprising: a transmitting unit, electrically connected with the processor, wherein the processor transmits at least one of the left image and the right image through the transmitting unit when the first button and the second button are triggered simultaneously and a triggering condition is matched, and at least one of the left image and the right image is a color image.

* * * * *